Patented Sept. 18, 1951

2,568,608

UNITED STATES PATENT OFFICE 2,568,608

POLYUNSATURATED NITROGEN-CON-
TAINING COMPOUNDS AND POLY-
MERS THEREOF

James A. Bralley, Bristol, Pa., assignor to The
B. F. Goodrich Company, New York, N. Y., a
corporation of New York No Drawing. Application March 19, 1947,
Serial No. 735,796

2 Claims. (Cl. 260—77.5)

This invention relates to new chemical compounds, and pertains more specifically to certain polyunsaturated nitrogen-containing compounds which are capable of polymerization to form hard non-thermoplastic polymers.

It is well known that various organic compounds containing a plurality of carbon to carbon double bonds such as the polyallyl esters, may be polymerized to form polymers of high molecular weight which are industrially useful. However, all of the materials previously known suffer from a variety of disadvantages, one of the most important of which is the fact that the polymerization is effected readily only in an atmosphere free of oxygen.

I have now discovered a certain class of nitrogen-containing polyunsaturated compounds which are liquid or low-melting solids and which possess the property of polymerizing readily in an atmosphere of air to form hard, non-thermoplastic, solid materials, particularly when heated in the presence of organic peroxide catalysts. The compounds in this class may be regarded as N-substituted alkenyl carbamates in which the substituent or substituents on the nitrogen also comprise one or more alkenyl groups. They may further be characterized in that each alkenyl group present contains a methylene (CH₂) group attached by a double bond to a carbon atom, the allyl, methallyl and vinyl groups being examples of such alkenyl groups. It is to be understood, therefore, that hereinafter the terms "alkenyl" and "carbalkenoxy" will sometimes be used without qualification, for sake of brevity, but will refer only to groups containing the characteristic

structure.

These compounds may be synthesized by reacting at least two molecular proportions of an alkenyl chlorocarbonate, (alkenyl chloroformate), such as allyl chlorocarbonate or methallyl chlorocarbonate, with one molecular proportion of an amino compound of low molecular weight, preferably in the presence of an alkaline catalyst, such as an alkali hydroxide or pyridine, which aids in the elimination of hydrogen chloride from the reactants. In the reaction at least two moles of hydrogen chloride are split out with the result that a plurality of reactive hydrogen atoms in the amino compound are replaced by carbalkenoxy radicals of the structure

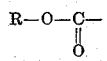

wherein R is an alkenyl group containing the CH₂=C< structure, examples of which are carballyloxy and carbmethallyloxy radicals. If the amino compound contains all of its reactive hydrogen atoms (that is, hydrogen atoms not attached to a carbon atom) present in amino groups, the resulting compound will contain a plurality of carbalkenoxy radicals each attached to a nitrogen atom, but if the amino compound also contains an hydroxyl group the hydrogen of the hydroxyl group may also be replaced by a carbalkenoxy radical. In any event the compounds of the invention comprise a plurality of carbalkenoxy radicals at least one of which is attached to a nitrogen atom having replaced an amino hydrogen in a low molecular weight amino compound.

Among the amino compounds which may be used in preparing the compounds of this invention are included inorganic amino compounds of molecular weight less than 100 such as ammonia, hydrazine and hydroxylamine and also organic amino compounds of molecular weight less than 100 including compounds containing at least two amino (NH₂) groups such as ethylene diamine, propylene diamine, trimethylene diamine, urea, guanidine, guanyl hydrozine carbohydrazide, semicarbazide and oxamide; compounds containing an amino group and an hydroxy group such as ethanol amine, 2-amino-2-methyl-propanol-1, and hydroxy urea and also other organic compounds of molecular weight less than 100 and containing an amino group such as ethyl amine, butyl amines, amyl amines, acetamide, acetamidine, urethane, cyanamide, amino acetone, propionamide, formamide, etc. The preferred reactants are those which contain two amino groups or one amino group and one hydroxy group since it is generally easier to replace a plurality of hydrogen atoms with carbalkenoxy radicals in such compounds than in compounds which contain only two replaceable hydrogens in a single NH₂ group. Compounds of molecular weight higher than 100 when used as reactants often give high melting compounds which are of little value in the preparation of hard, non-thermoplastic polymers.

Among the alkenyl chlorocarbonates which may be used to react with the above-described amino compounds to produce the compounds of this invention are included allyl chlorocarbonate, methallyl chlorocarbonate, vinyl chlorocarbonate, and the like.

The following equations will serve to illustrate the reactions occurring when several of the above-mentioned amino compounds are reacted with an unsaturated chlorocarbonate.

(I) 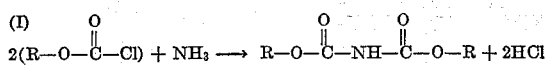

(II) 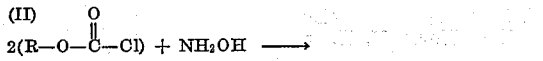

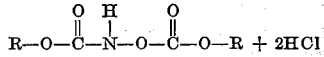

(III) 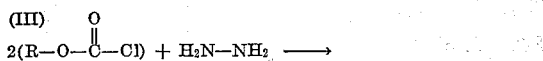

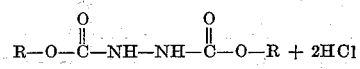

(IV) 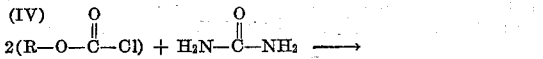

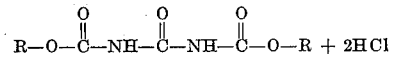

(V) 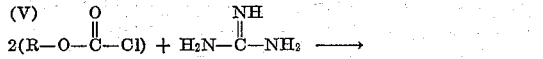

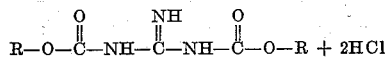

(VI) 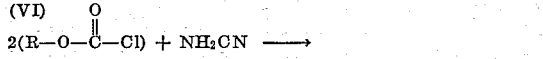

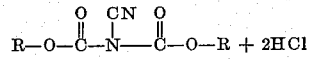

In many instances it is also possible to replace more than two hydrogen atoms with carbalkenoxy radicals. For example, when three moles of chlorocarbonate are reacted with one mole of ammonia, the compound having three carbalkenoxy radicals attached to nitrogen is formed.

The following specific examples are intended to illustrate more fully the nature of the invention, but are not to be construed as a limitation upon the scope thereof.

*Example I*

34.8 parts by weight (0.5 mole) of hydroxylamine hydrochloride were dissolved in 100 cc. of distilled water and 190 parts (1.58 moles) of allyl chlorocarbonate were added. 84.0 parts (2.1 moles) of sodium hydroxide were then added slowly with constant stirring, the temperature being maintained at approximately 20° C. The reaction mixture was then diluted with water, extracted with ether, and the ether removed by evaporation.

The crude product was then heated to 100° C. under 1 mm. of vacuum. Distillation at reduced pressures yielded tri-carballyloxy hydroxylamine, a liquid compound boiling at 75° C. at 0.005 mm. pressure and possessing the formula:

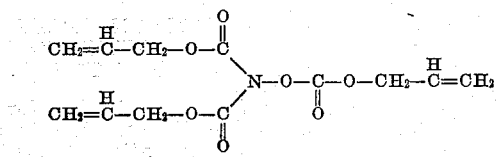

*Example II*

52.5 parts by weight (0.5 mole) of hydrazine dihydrochloride and 232.2 parts (2.1 moles) of allyl chlorocarbonate were placed in a flask. 124 parts (3.1 moles) of sodium hydroxide dissolved in 250 cc. of distilled water were then added slowly and with constant stirring, the temperature being held between 20° C. and 40° C.

Water was then added to the reaction mixture and the product layer drawn off. The product was washed with several portions of water, heated to 110° C. at 20 mm. pressure, and then allowed to cool. At this point a large quantity of small needle-like crystals precipitated. The precipitate was found to be diallyl bicarbamate, which may also be called dicarballyloxy hydrazine (M. P. 86°–87° C.) of the formula:

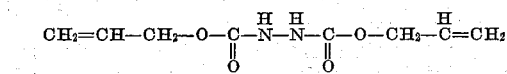

By allowing the reaction to proceed for a longer time at a higher temperature, and by using an even larger molar excess of the chlorocarbonate, it is possible to obtain tri- and tetra-carballyloxy hydrazine.

In a manner similar to that described in the above examples, other polyunsaturated nitrogen-containing compounds which are liquids or low-melting solids under ordinary conditions are prepared when using other amino compounds of the type set forth. Thus, the following table shows the compounds formed when two moles of allyl chlorocarbonate are reacted with the listed amino compounds.

| Amino Compound Reacted | Product Formed | Formula |
|---|---|---|
| Ammonia | N-carballyloxyallyl carbamate | $CH_2=\overset{H}{\underset{\,}{C}}-CH_2-O-\overset{O}{\underset{\,}{C}}-\overset{H}{\underset{\,}{N}}-\overset{O}{\underset{\,}{C}}-O-CH_2-\overset{H}{\underset{\,}{C}}=CH_2$ |
| Urea | diallyl urea dicaboxylate | $CH_2=\overset{H}{\underset{H}{C}}-\overset{H}{\underset{\,}{C}}-O-\overset{O}{\underset{\,}{C}}-\overset{H}{\underset{\,}{N}}-\overset{O}{\underset{\,}{C}}-\overset{H}{\underset{\,}{N}}-\overset{O}{\underset{\,}{C}}-O-\overset{H}{\underset{H}{C}}-\overset{H}{\underset{\,}{C}}=CH_2$ |
| Guanidine | diallyl guanidine dicarboxylate | $CH_2=\overset{H}{\underset{H}{C}}-\overset{H}{\underset{\,}{C}}-O-\overset{O}{\underset{\,}{C}}-NH-\overset{NH}{\underset{\,}{C}}-NH-\overset{O}{\underset{\,}{C}}-O-\overset{H}{\underset{H}{C}}-\overset{H}{\underset{\,}{C}}=CH_2$ |
| Cyanamide | diallyl cyanamide dicarboxylate | $CH_2=\overset{H}{\underset{H}{C}}-\overset{H}{\underset{\,}{C}}-O-\overset{O}{\underset{\,}{C}}-\overset{CN}{\underset{\,}{N}}-\overset{O}{\underset{\,}{C}}-O-\overset{H}{\underset{H}{C}}-\overset{H}{\underset{\,}{C}}=CH_2$ |

| Amino Compound Reacted | Product Formed | Formula |
|---|---|---|
| Ethanolamine | allyl beta-(carballyloxy-amino)-ethyl carbonate | $CH_2{=}\overset{H}{\underset{H}{C}}{-}\overset{H}{\underset{H}{C}}{-}O{-}\overset{O}{\underset{}{C}}{-}O{-}\overset{H}{\underset{H}{C}}{-}\overset{H}{\underset{H}{C}}{-}\overset{H}{\underset{}{N}}{-}\overset{O}{\underset{}{C}}{-}O{-}\overset{H}{\underset{H}{C}}{-}\overset{H}{\underset{}{C}}{=}CH_2$ |
| Acetamide | N,N,-dicarballyloxy acetamide | $CH_3-\overset{O}{\underset{O}{C}}-N\begin{array}{l}\overset{O}{\underset{}{C}}-O-CH_2-CH=CH_2\\ \overset{O}{\underset{}{C}}-O-CH_2-CH=CH_2\end{array}$ |
| Ethylenediamine | 1,2, bis (carballyloxy-amino) ethane | $CH_2{=}\overset{H}{\underset{H}{C}}{-}\overset{H}{\underset{H}{C}}{-}O{-}\overset{O}{\underset{}{C}}{-}\overset{H}{\underset{H}{N}}{-}\overset{H}{\underset{H}{C}}{-}\overset{H}{\underset{H}{C}}{-}\overset{H}{\underset{}{N}}{-}\overset{O}{\underset{}{C}}{-}O{-}\overset{H}{\underset{H}{C}}{-}\overset{H}{\underset{}{C}}{=}CH_2$ |

As mentioned hereinabove, the polyunsaturated nitrogen-containing compounds of this invention may be polymerized by heating in the presence of any of the usual catalysts. For example, 45 parts by weight of the product of Example I were mixed with 1 part of o-chloro benzoyl peroxide in an open vessel in an atmosphere of air. The mixture was then heated at 65° C. for an hour. At this point the liquid monomer had gelled. The gelled solid was then heated at 100° C. for three hours. The final product was a hard, transparent, non-thermoplastic, solid material having a Barcol Impressor hardness of about 28.

It will be noted that the polymerization of the nitrogen-containing compound of this invention was readily carried out in an atmosphere of air, thus overcoming the difficulty encountered with most polyallyl esters, which polymerize satisfactorily only in an atmosphere substantially free of oxygen.

Other polyunsaturated nitrogen-containing compounds within the scope of this invention may be polymerized by similar methods using the same or other catalysts. It is also possible to polymerize mixtures of two or more of these compounds with each other or with other polymerizable unsaturated compounds, or with plasticizers, pigments, fillers, other polymers or resins, etc. Desirable modifications in the properties of the final resinous product are thereby secured.

Although specific examples of the invention have been herein described, it is not intended that the invention be limited solely thereto, for numerous variations and modifications will occur to those skilled in the art and are within the spirit and scope of the appended claims.

I claim:

1. As a new chemical compound, tri-carballyloxy hydroxylamine of the formula

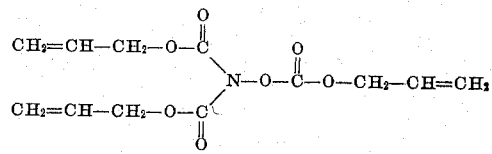

2. A polymer of the compound of claim 1.

JAMES A. BRALLEY.

REFERENCES CITED

The following references are of record in the file of this patent:

UNITED STATES PATENTS

| Number | Name | Date |
|---|---|---|
| 2,378,571 | Moldenhauer | June 19, 1945 |
| 2,390,551 | Muskat | Dec. 11, 1945 |
| 2,394,592 | Chenicek | Feb. 12, 1946 |
| 2,395,750 | Muskat | Feb. 26, 1946 |
| 2,401,549 | Chenicek | June 4, 1946 |

FOREIGN PATENTS

| Number | Country | Date |
|---|---|---|
| 873,710 | France | July 17, 1942 |